(No Model.)
C. HERING & F. DAUM.
ROLLER CULTIVATOR.
No. 305,923. Patented Sept. 30, 1884.
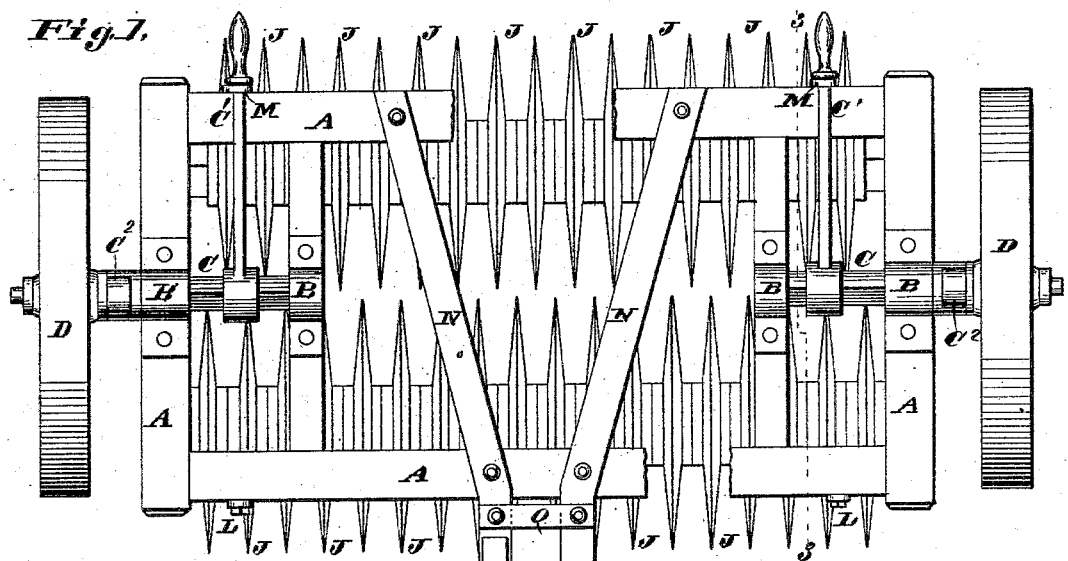
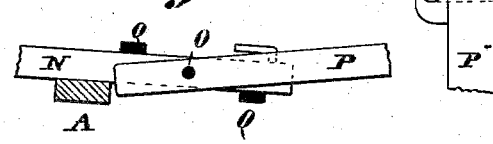
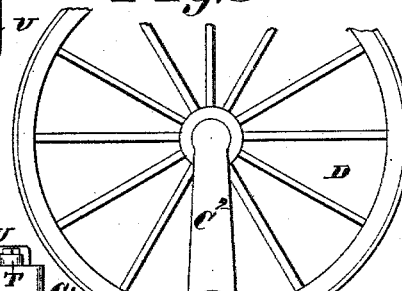
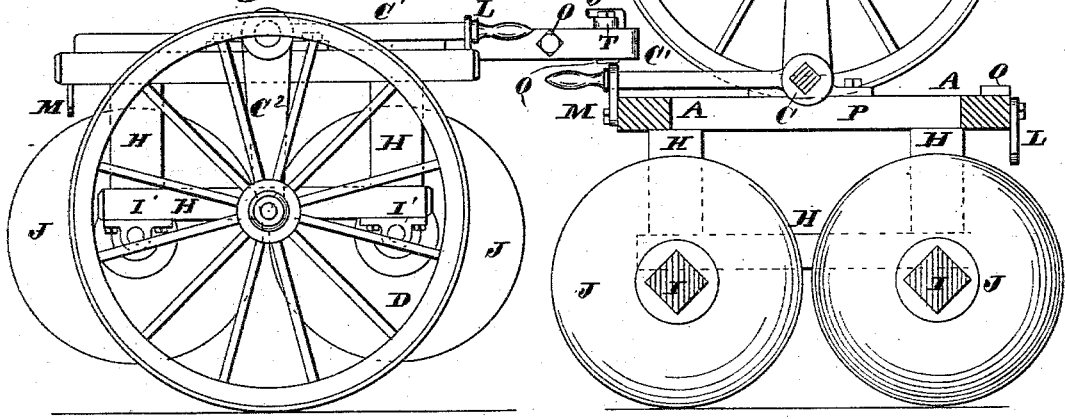
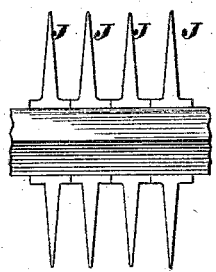
Attest:
Charles Pickles
Geo. L. Wheelock
Inventor:
Christ Hering
Fred Daum
By Knight Bros
attys
N. PETERS, Photo-Lithographer, Washington, D. C.

UNITED STATES PATENT OFFICE.

CHRIST HERING AND FRED DAUM, OF PRAIRIE TOWN, ILLINOIS.

ROLLER-CULTIVATOR.

SPECIFICATION forming part of Letters Patent No. 305,923, dated September 30, 1884.

Application filed February 2, 1884. (No model.)

*To all whom it may concern:*

Be it known that we, CHRIST HERING and FRED DAUM, both of Prairie Town, in the county of Madison and State of Illinois, have invented a certain new and useful Improvement in Roller-Cultivators, of which the following is a full, clear, and exact description, reference being had to the accompanying drawings, forming part of this specification, and in which—

Figure 1 is a top view with part of the frame broken away. Fig. 2 is a side view. Fig. 3 is a longitudinal section taken on line 3 3, Fig. 1. Figs. 4 and 5 are detail views.

Our invention relates to certain improvements in roller or rotary cultivators, in which the carrying-wheels can be elevated above the frame when the machine is in use, and the tongue can also be loosened; and it consists in features of novelty hereinafter fully described, and pointed out in the claims.

Referring to the drawings, A represents a suitable frame to which are journaled, in boxes B, rock-shafts C, having levers C' secured to them, and being provided with cranks $c^2$ on their outer ends, to which are journaled, on suitable arbors projecting therefrom, ground-wheels D.

Depending from the frame A at each side is a frame. H, to which are secured the ends of shafts I by suitable journal-boxes, I'. We prefer to make the shafts square between the boxes I', and slipped over them are gangs of pulverizing-disks J, which have hubs (see Figs. 1 and 5) to hold them the proper distance apart. As the apparatus is drawn forward the shafts turn, and thus the disks are revolved. We have shown two series of disks; but one or more than two may be used. During transportation the ground-wheels are turned down into the position shown in Fig. 2, lifting the disks from the ground, being forced into that position by the levers C', and being held there by hooks or catches L, pivoted to the front of the frame A, which engage over the outer ends of the levers. When the apparatus is at work, the ground-wheels are raised above the frame, as shown in Fig. 3, by means of the levers, and held there by hooks or catches M, pivoted to the rear or back edge of the frame A, and the disks are thus allowed to rest upon the ground when in use and to be raised therefrom during transportation, or when not in use. During transportation it is desirable to have a stiff, rigid tongue, while it is desirable to have a loose tongue when the apparatus is at work, so that the disks will accommodate themselves to the irregularities of the ground. To accomplish this we secure hounds N to the frame A, and pivot to them, by means of a bolt, O, the tongue P. The two parts of the hounds are connected by strips Q, one below and the other above the tongue and on opposite sides of the bolt O. (See Fig. 4.)

T represents another strip or plate, similar to those Q, which is pivoted by one end to one side of the hounds, above the tongue and in front of the bolt O, and which can be swung over the tongue, as shown in Fig. 2 and by dotted lines in Fig. 1, when its free end engages under an L-shaped hook, U; or it may be swung back from over the tongue, as represented by full lines in Fig. 1. When this lock-plate is over the tongue, it will be seen that the tongue will be rigidly secured to the hounds for transportation of the apparatus, and when it is swung back the tongue will be loose, allowing the frame and the disks to rock. (See Fig. 4.

We claim as our invention—

A rotary cultivator consisting of a rectangular frame, A, having journal-boxes B B B B, square shafts C C, journaled in said boxes, bell-crank levers C' $C^2$ C' $C^2$, fitting on said shafts, and provided with arbors at their inner ends, ground-wheels D D, mounted on the said arbors, so as to be supported either wholly above or wholly beneath the frame, catches L and M on the rear and front edges of the frame to hold the levers either to the front or to the rear, as shown, vertical frames H H depending from the horizontal frame and having journal-boxes I' I' I' I', shafts I I, journaled in the vertical frame-boxes, and gangs of disks J, having separating-hubs, and mounted on the shafts I I, as set forth.

CHRIST HERING.
FRED DAUM.

In presence of—
CHAS. F. WILHARM,
ALBERT FARNER.